United States Patent
Ohgane et al.

(10) Patent No.: US 7,101,610 B2
(45) Date of Patent: Sep. 5, 2006

(54) PAINT SUBSTITUTE FILM AND METHOD OF APPLYING SAME

(75) Inventors: Hitoshi Ohgane, Saitama (JP); Akihiro Shibuya, Saitama (JP); Keisuke Kojima, Saitama (JP); Noriyuki Yamanaka, Saitama (JP)

(73) Assignee: Honda Motor Co. Ltd., Tokyo (JP)

( * ) Notice: Subject to any disclaimer, the term of this patent is extended or adjusted under 35 U.S.C. 154(b) by 184 days.

(21) Appl. No.: 10/740,479

(22) Filed: Dec. 22, 2003

(65) Prior Publication Data

US 2004/0131864 A1  Jul. 8, 2004

(30) Foreign Application Priority Data

Dec. 25, 2002  (JP) ............... 2002-373785

(51) Int. Cl.
- B32B 7/02 (2006.01)
- B32B 7/04 (2006.01)
- B32B 27/30 (2006.01)
- B32B 27/32 (2006.01)
- B32B 27/36 (2006.01)

(52) U.S. Cl. .............. 428/212; 428/213; 428/215; 428/216; 428/332; 428/334; 428/339; 428/480; 428/483; 428/515; 428/516; 428/520; 428/522; 428/523; 428/423.1; 428/423.7; 428/424.2; 428/424.8

(58) Field of Classification Search .............. None
See application file for complete search history.

(56) References Cited

U.S. PATENT DOCUMENTS

| | | | |
|---|---|---|---|
| 3,660,143 A * | 5/1972 | Johnson et al. ........ 428/423.1 |
| 4,810,540 A * | 3/1989 | Ellison et al. ............. 428/31 |
| 5,707,697 A * | 1/1998 | Spain et al. ............... 428/31 |
| 5,725,712 A * | 3/1998 | Spain et al. .............. 156/230 |
| 5,912,081 A * | 6/1999 | Negele et al. ........... 428/423.1 |
| 5,919,537 A * | 7/1999 | Niazy ........................ 428/40.1 |
| 5,968,657 A * | 10/1999 | Scullin et al. ........... 428/423.1 |
| 6,083,335 A * | 7/2000 | Scullin et al. ............. 156/196 |
| 6,399,193 B1 * | 6/2002 | Ellison .................... 428/354 |
| 6,551,432 B1 * | 4/2003 | Spain et al. .............. 156/230 |
| 6,579,397 B1 * | 6/2003 | Spain et al. .............. 156/230 |
| 6,649,003 B1 * | 11/2003 | Spain et al. .............. 156/230 |
| 6,797,391 B1 * | 9/2004 | Shibato et al. .............. 428/447 |
| 6,835,267 B1 * | 12/2004 | Spain et al. .............. 156/230 |
| 6,838,130 B1 * | 1/2005 | Spain et al. ................. 428/31 |
| 2002/0054961 A1 * | 5/2002 | Spain et al. ............. 427/407.1 |
| 2002/0086138 A1 * | 7/2002 | Iijima ...................... 428/141 |
| 2004/0138368 A1 * | 7/2004 | Ohgane et al. ............ 524/439 |

FOREIGN PATENT DOCUMENTS

EP  0 266 109 A2 *  5/1988

(Continued)

*Primary Examiner*—Vivian Chen
(74) *Attorney, Agent, or Firm*—Arent Fox PLLC

(57) ABSTRACT

A paint substitute film product 1 for surfacing an object S includes a decorative coat including a light-curable resinous layer, and a protective film provided over a surface of the light-curable resinous layer of the decorative coat. An adhesion strength AS1 between a surface of the object and the decorative coat, an adhesion strength AS2 between the protective film and the decorative coat, and a tensile strength TS of the decorative coat are configured to exhibit the equation: AS1>AS2>TS. The paint substitute film product 1 can deliver increased economy in surfacing the object, and the step of forming the object to be surfaced and the step of applying the paint substitute film can be provided independently.

6 Claims, 4 Drawing Sheets

ADHESION STRENGTH AS2 > TENSILE STRENGTH TS

FOREIGN PATENT DOCUMENTS

| | | |
|---|---|---|
| JP | 63-123469 | 5/1988 |
| JP | 02-095817 | 4/1990 |
| JP | 2-503077 | 9/1990 |
| JP | 07-009484 | 1/1995 |
| JP | 11-123897 | 5/1999 |
| WO | WO 88/07416 | 10/1988 |

* cited by examiner

PAINT SUBSTITUTE FILM AND METHOD OF APPLYING SAME

BACKGROUND OF THE INVENTION

This invention relates to a paint substitute film used as substitutes for painting of exterior components of an automobile or the like.

In order to improve an ornamental design of exterior components or trims, such as fenders, bumpers, hoods, wheel caps, and other plastic components, of a vehicle, spray paint is employed in most instances. However, a painting process including an operation of spraying paint requires a large facility and wide space for repeatedly performed painting and drying steps and thus would disadvantageously reduce productivity and manageability. In this respect, an alternative approach has been sought, and an application of a colored decorative film (hereinafter referred to as "paint substitute film") to an exterior component or the like as substitutes for the painting process has been receiving attention in recent years.

A paint substitute film as conventionally used, for example as disclosed in JP 63-123469 A, has a trilaminar structure including a transparent layer, a pigmented coating, and an adhesive layer. JP 63-123469 A teaches a process of applying the film to a target object to which a decorative effect will be given. The process is schematically illustrated in FIGS. 6A–6D. First, as shown in FIG. 6A, the film 31 is formed three-dimensionally in a supporting mold 32 so as to conform to a contoured surface of the target object; then, as shown in FIG. 6B, end portions of the film 31 are trimmed off. The trimmed film 31 is placed for example into an injection mold 34 as shown in FIG. 6C, and bonded to the target object 33 while the target object 33 is being formed. A resultant casting of a decorated component is taken out of the injection mold 34 as shown in FIG. 6D. Another technique for applying a paint substitute film using an injection mold is disclosed in JP 7-9484 A.

The process of applying a paint substitute film as illustrated in FIGS. 6A–6D require a trimming step using a cutting blade, a laser, a hot wire or the like. In particular, when the target object 33 to which a decorative effect will be given has a complicate shape, a trimmed portion thereof becomes complicate too, and thus the cost incurred for the trimming step would add up, which could eventually raise the total cost of production, thereby making the final casting expensive.

In addition, with the above-described technique using the injection molding, molding of the target object and applying of the paint substitute film are performed simultaneously in the same process step; therefore, the applicable target object (component) should disadvantageously be restricted to those made of materials which can be formed by injection molding.

The present invention has been created to address the above-discussed disadvantages.

SUMMARY OF THE INVENTION

In one aspect of the present invention, there is provided a paint substitute film product for surfacing an object, comprising a decorative coat including a light-curable resinous layer, and a protective film provided over a surface of the light-curable resinous layer of the decorative coat, wherein the following equation is satisfied:

$$AS1 > AS2 > TS \tag{1}$$

where AS1 denotes an adhesion strength between the surface of the object and the decorative coat, AS2 denotes an adhesion strength between the protective film and the decorative coat, and TS denotes a tensile strength of the decorative coat.

Since Equation (1) is satisfied, the paint substitute film product can be trimmed of an excess end portion thereof automatically while the protective film is peeled off; i.e., the protective film and the excess end portion of the paint substitute film product are removed from the decorative film adhered to the surface of the object simultaneously in one and the same operation. Accordingly, the step of trimming as a separate process step is not necessitated. In this respect, the above paint substitute film product can deliver increased economy in surfacing the object. Moreover, the paint substitute film (decorative coat) can be applied to any objects provided off the shelf; in other words, the material of the target object to which a desired decorative effect is to be given is not limited to the materials fit for subjecting to injection molding.

The above paint substitute film product may preferably be configured such that the light-curable resinous layer that has been cured exhibits an elongation percentage ranging between 5% and 10% inclusive. This configuration provides good conformity to a variety of degrees of convexity in the shapes of the objects to be surfaced, and serves to make the trimmed end face of the decorative coat smooth.

In another aspect of the present invention, there is provided a method of applying a paint substitute film to a surface of an object. The method includes the steps of: (1) adhering the above paint substitute film product to the surface of the object so that an end of the paint substitute film product overreaches an boundary of the surface of the object, to form an excess end portion of the paint substitute film product; (2) irradiating the light-curable resinous layer with light through the protective film to cure the light-curable resinous layer; (3) peeling off the protective film from the decorative coat while removing the excess end portion from the paint substitute film product adhered to the surface of the object.

The above method can serve to obviate the need for a separate step of trimming, and thus deliver increased economy in surfacing the object. Moreover, the paint substitute film (decorative coat of the paint substitute film product) can be applied to any objects provided off the shelf; in other words, the material of the target object to which a desired decorative effect is to be given is not limited to the materials suitable for injection molding. Further, the above method provides a simplified process, which serves to improve production efficiency of the desirably surfaced castings.

Other advantages and further features of the present invention will become readily apparent from the following description of preferred embodiments with reference to accompanying drawings.

BRIEF DESCRIPTION OF THE DRAWINGS

3A shows a state of the paint substitute film product with a protective film remaining on a decorative coat thereof; FIG. 3B shows a state of the paint substitute film product of which the protective film is being peeled off.

DETAILED DESCRIPTION OF THE PREFERRED EMBODIMENTS

Figure 1:
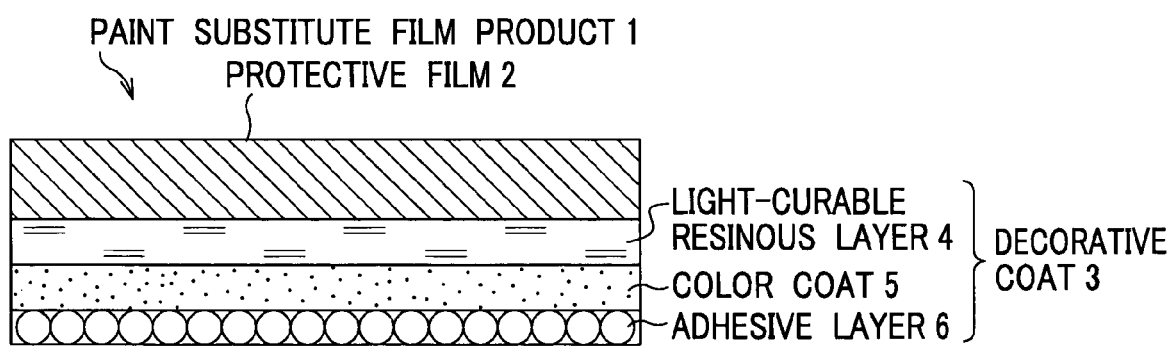
FIG. 1 is a partial magnified view in cross section of a paint substitute film product according to the present invention.

A description will be given of preferred embodiments of the present invention with reference to the drawings. As shown in FIG. 1, a paint substitute film product 1 includes from outside (front side) thereof a protective film 2 and a decorative coat 3. The decorative coat 3 includes a light-curable resinous layer 4 formed at a location near the protective film 2. The decorative coat 3 has a trilaminar structure including from outside (front side) thereof the light-curable resinous layer 4, a color coat 5 and an adhesive layer 6. In the present embodiment, the light-curable resinous layer 4 is in contact with the protective film 2, but the location of the light-curable resinous layer 4 according to the present invention is not limited thereto. In other words, the light-curable resinous layer 4 is provided between the protective film 2 and the color coat 5, and the protective film 2 is provided over a surface of the light-curable resinous layer for example to protect the decorative coat 3 (i.e., the color coat 5 thereof) until the paint substitute film (decorative coat 3) is adhered to an object S to be surfaced (see FIG. 2) (i.e., before the light-curable resinous layer 4 is cured). The protective film 2 is an element to be peeled off after the paint substitute film is adhered to the object S to be surfaced (and the light curable resinous layer 4 is cured).

Figure 2:
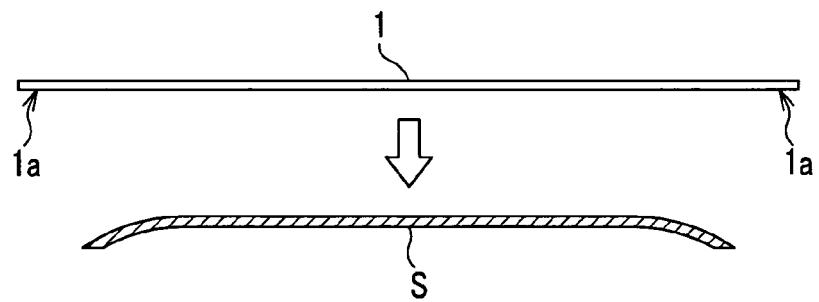
FIG. 2 is a schematic diagram for explaining an application of the paint substitute film product to an object to be surfaced with a paint substitute film.

Considerations to be given in the choice of materials of the protective film 2 are as follows:

(1) high solvent resistance; that is, capability of preventing cracks that would otherwise occur due to solvent included in light-curable resins applied to the protective film 2 when the light-curable resinous layer 4 is formed;

(2) high transparency; that is, capability of transmitting light such that the light-curable resinous layer 4 can be cured by the light passing through the protective film 2;

(3) sufficient elongation percentage; that is, elongation property that permits the protective film 2 to conform to the shape of the object S to be surfaced, even if the object S to be surfaced has a convexly curved portion as shown in FIG. 2 or deep-drawn portion; and (4) appropriate peeling ease; that is, the protective film 2 can be peeled off as necessary.

Films having the above preferable features for the protective film 2, for example, include a non-oriented polyethylene terephthalete film and a non-oriented polypropylene film. The thickness of the protective film 2 may preferably fall within a range of 50 µm through 300 µm, because too thin film would impair handleability and too thick film would reduce formability. In particular instances, a laminate of the non-oriented polyethylene terephthalete film and the non-oriented polypropylene film, or the like may be employed for the protective film 2.

The light-curable resinous layer 4 may for example include a mixture of an acrylic polymer, a urethane oligomer, an elastomer component and a photopolymerization initiator. This mixture initiates consecutive polymerization on exposure to ultraviolet radiation, to form an acryl-based resinous coat. Since the light-curable resinous layer 4 becomes the outmost surface of the paint substitute film after the protective film 2 is removed, the light-curable resinous layer 4, when cured, may preferably have sufficiently high wear and chemical resistance. In this respect, the aforementioned resin is one of the desirable materials. The light-curable resinous layer 4 having sufficiently high wear and chemical resistance after it is cured can save the need for having another protective coat formed thereon, and can thus provide a cost-effective paint substitute film product 1.

Figure 4:
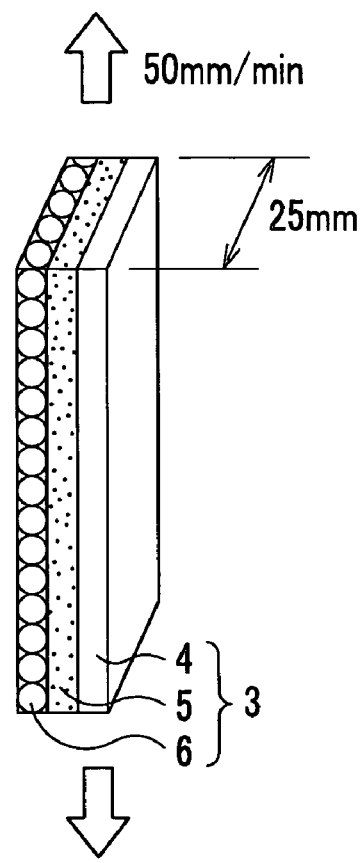
FIG. 4 is a schematic diagram for illustrating a tensile test for the decorative coat.

Moreover, the light-curable resinous layer 4 may preferably be configured to, when cured, exhibit an elongation percentage ranging between 5% and 10% inclusive, where the elongation percentage is a percentage of elongation until fracture occurs (maximum elongation percentage at break) using a tensile test for a decorative coat 3 with a test specimen of 25 mm in width, at a tension speed of 50 mm/min. in a longitudinal direction, as shown in FIG. 4. The reasons therefor will be given later.

The color coat 5 is a layer having a colored portion serving as a substitute for painting, which may for example be made of a color material including pigments or dyes as prepared in a desired color and a polyurethane resin as a binder. Adhesive agents for forming the adhesive layer 6 may be selected as appropriate in accordance with the material of an object S to be surfaced, for example from organic materials containing an epoxy group or an urethane group.

The paint substitute film product 1 having a layered structure as described above may be fabricated without any particular limitation placed on its method or apparatus. For example, a coating apparatus known in the art such as a roll coater, a knife coater and a comma coater may be used to apply resins for the light-curable resinous layer 4, color coat 5, and adhesive layer 6 in this order to the protective film 2.

This is one of economical methods for fabricating the paint substitute film product 1. In one aspect, the present invention is characterized by a particular relationship among an adhesion strength AS1 between a surface of the object S to be surfaced and the decorative coat 3 (i.e., the adhesive layer 6 thereof), an adhesion strength A2 between the protective film 2 and the decorative coat 3 (i.e., the light-curable resinous layer 4 thereof) and a tensile strength TS of the decorative coat 3, which relationship is given by Equation (1) below:

$$AS1 > AS2 > TS \tag{1}$$

where the tensile strength TS is a stress required to entirely rupture the decorative coat 3 when a stretching load given to the decorative coat 3 in a direction parallel to a surface thereof. The units for use with the strength AS1, AS2 and TS are strength per unit area.

Figure 5:
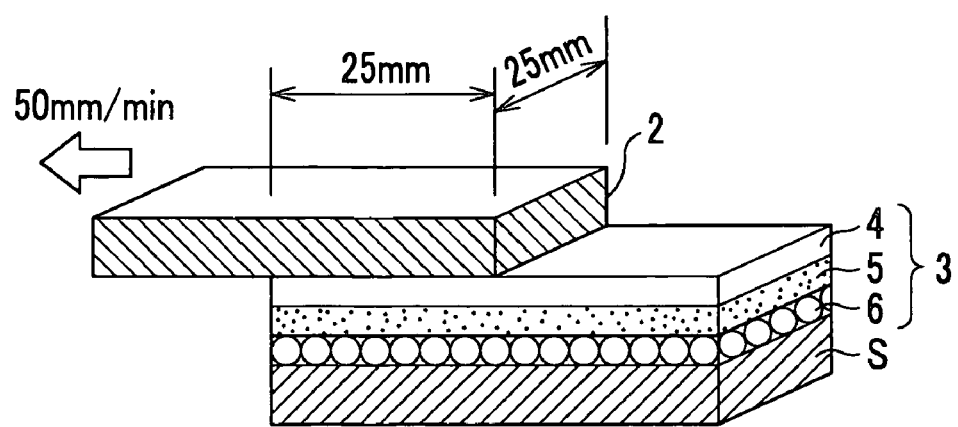
FIG. 5 is a schematic diagram for illustrating a shear adhesion test for verifying adhesion strength between the decorative coat and the protective film.
Figure 6:
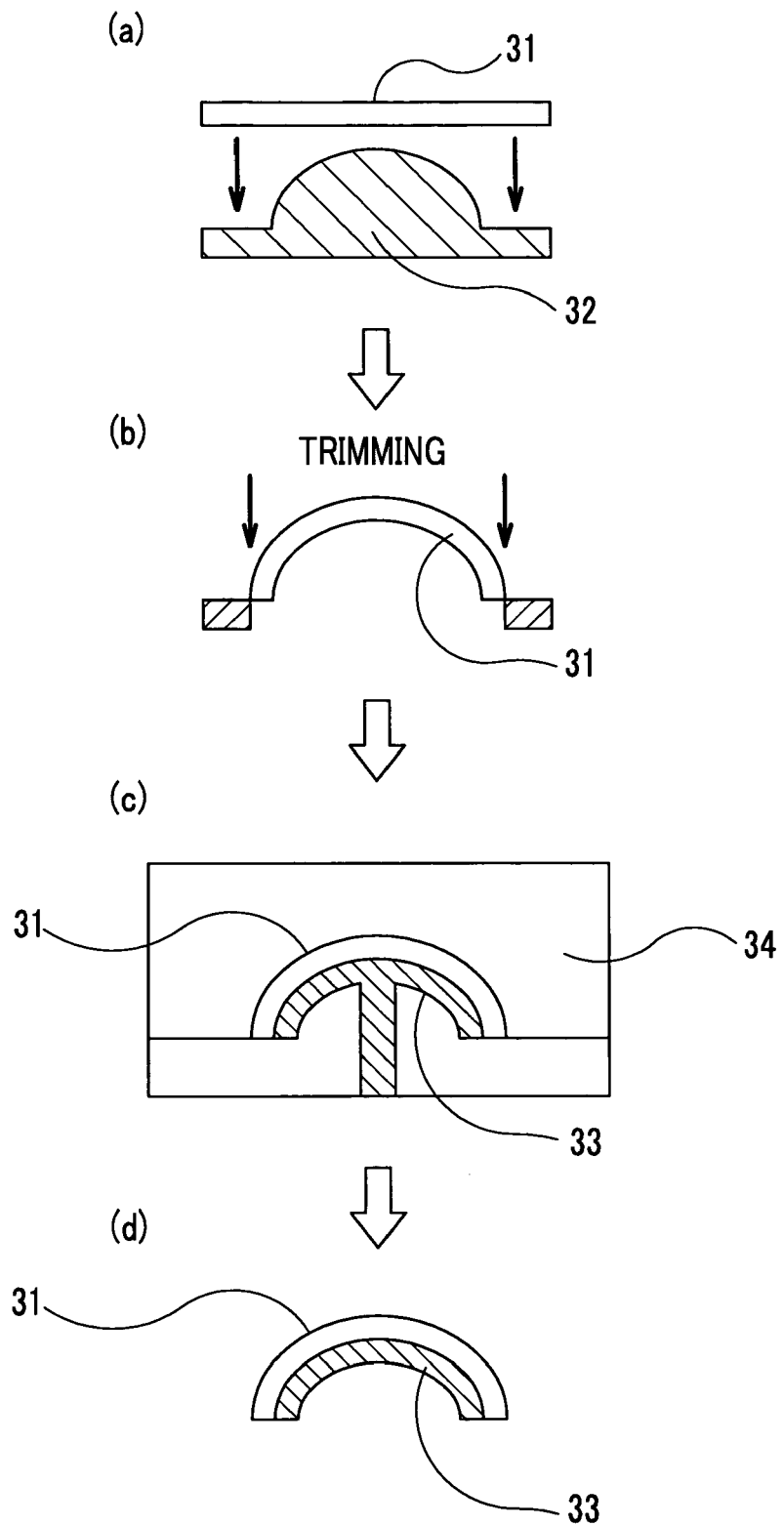
FIG. 6 is a schematic diagram for illustrating a process of applying a conventional paint substitute film to an object to be surfaced therewith.

The inventors verified the relationship between the adhesion strength AS1 and AS2 through a shear adhesion test carried out with a shearing direction of the paint substitute film product 1 being parallel to the surface of the paint substitute film product 1, as shown in FIG. 5. The shear adhesion test uses a test specimen of 25 mm in width and 25 mm in overlap length in the shearing direction between the protective film 2 and the object S to be surfaced, and the protective film 2 is pulled at a tension speed of 50 mm/min.

The inventors verified the tensile strength TS through a tensile test (decorative coat tensile strength test) as described above with reference to FIG. 4.

The results of the tests as described above have shown that the tensile strength TS stands at 19.6 KPa and the adhesion strength AS2 stands at 118 KPa. None of peel, break, shear, wrinkling or the like has been observed between the object S to be surfaced and the decorative coat 3, and it has thus turned out that the adhesion strength AS1 has an adhesion strength greater than 118 KPa at the least. From the foregoing, it has been verified that the paint substitute film product 1 has a feature exhibiting a relationship given by Equation (1).

It has also been verified that the thickness of the decorative coat 3 in its entirety may be adjusted to 100 μm or thinner in order to obtain a favorable property for establishing a relationship of AS2>TS. The adhesion strength AS2 between the protective film 2 and the decorative coat 3 (i.e., light-curable resinous layer 4) is a strength derived mainly from vacuum adhesion of a contact surface therebetween, and it would thus be relatively difficult to adjust the value of the adhesion strength AS2. Therefore, in an effort to make it easier to obtain a favorable property for establishing the relationship of AS2>TS, it has turned out that the tensile strength TS may be adjusted correctly without substantial variation among products by making the thickness of the decorative coat 3 equal to or thinner than 100 μm in its entirety.

Hereafter, a description will be given of a process of applying a paint substitute film to an object S to be surfaced. The object S to be surfaced may include, but not be limited to, exterior components such as a bumper, etc.

First of all, the paint substitute film product 1 is adhered to a surface of the object S for example by vacuum forming or the like. In particular, a double-sided suction vacuum forming device (not shown) known in the art may be employed to obtain a desired product without marks of suction holes left on the decorated surface of the object S. Accordingly, the paint substitute film product 1 is adhered to the object S to be surfaced with an adhesion strength AS1 as described above. Hereupon, the paint substitute film product 1 is adhered to the object S so that an end of the paint substitute film product 1 overreaches a boundary of the surface of the object S, to form an excess end portion 1a, which is not adhered to the object S, of the paint substitute film product 1.

Figure 3A:
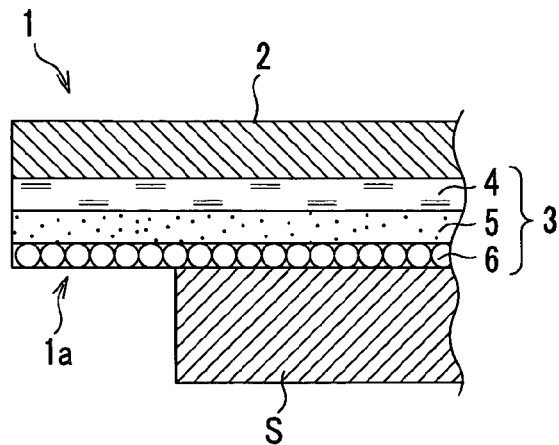
FIGS. 3A through 3B are schematic views in cross section of a paint substitute film product applied to an object to be surfaced for explaining features and operations thereof. FIG.
Figure 3B:
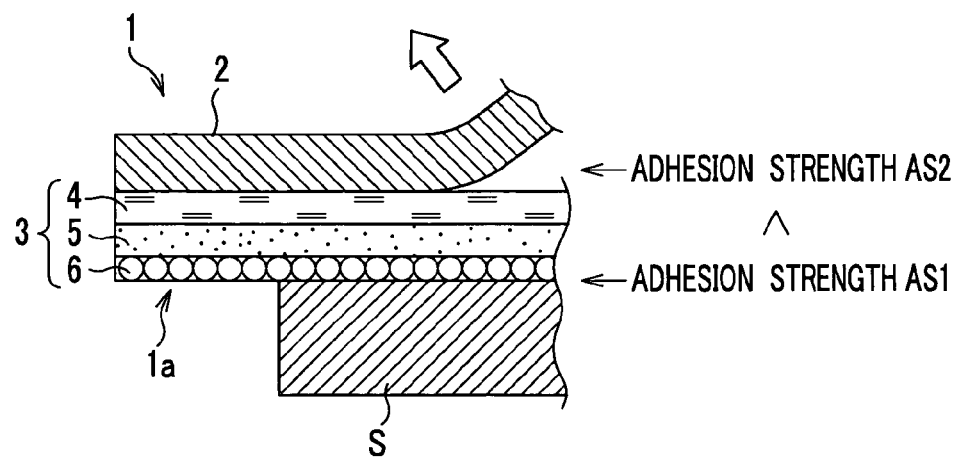
Figure 3C:
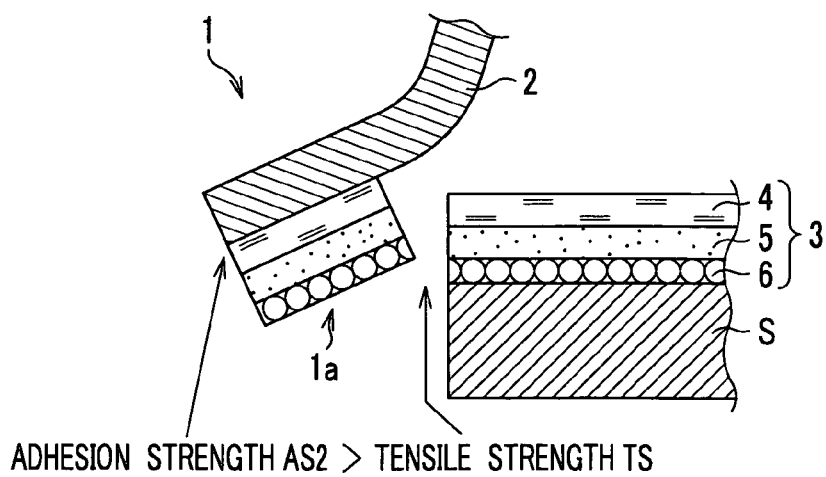
FIG. 3C shows a state of the paint substitute film product from which the protective film and excess end portion thereof are removed.

Next, ultraviolet light is radiated through the protective film 2 to cure the light-curable resinous layer 4. When the light-curable resinous layer 4 is cured, the protective film 2 is peeled off as shown in FIG. 3B from the decorative coat 3. Since the relationship of AS1>AS2 is being established, the decorative coat 3 remains adhered to the object S to be surfaced, while the protective film 2 alone is peeled off. Moreover, the decorative coat 3 is being adhered with the adhesion strength AS1, and thus a portion thereof adhered to the object S would never be ruptured when the protective film 2 is peeled off.

The protective film 2 that has been peeled off up to the end of the object S is then removed together with the excess end portion 1a ruptured off at the end of the object S from the paint substitute film. The excess end portion 1a is ruptured off at the end of the object S because no adhesion strength AS1 acts on the excess end portion 1a while the adhesion strength AS2 acting on the excess end portion 1a is greater than the tensile strength TS thereof. Consequently, the paint substitute film can be trimmed automatically of the end portion when the protective film 2 is peeled off, and thus the final casting with a desired decorative effect can be obtained without an extra process step of trimming off the excess end portion 1a of the paint substitute film product 1.

The elongation percentage the light-curable resinous layer 4 that can exhibit after it is cured may preferably range between 5% and 10% inclusive for reasons as cited below. If the elongation percentage is less than 5%, the light-curable resinous layer 4 cannot conform to the change in shape (swelling or shrinking with temperature change, or the like) of the object S to be surfaced when the paint substitute film is applied to the object S, so that a fracture in the film would be likely to occur. If the elongation percentage is more than 10%, the decorative coat 3 would be likely to undergo elongation when the protective film 2 is peeled off, with the result that removing the excess end portion 1a would leave burrs or ragged edges in a fracture surface of the paint substitute film, and thus a smoothly trimmed surface could not be obtained. To prevent such problems, the light-curable resinous layer is configured to, when cured, exhibit an elongation percentage ranging between 5% and 10% inclusive to fabricate a desirable paint substitute film product 1.

Although the preferred embodiments of the present invention have been described above, layouts, shapes, and so forth of the elements are not limited to those illustrated in the drawings, and various modifications and changes may be made in the present invention without departing from the spirit and scope thereof. In the above description of the preferred embodiment of the present invention, it is assumed that the paint substitute film is applied to a component of an automobile or the like. However, the object S to be surfaced according to the present invention is not limited thereto, but the paint substitute film can be applied to vehicles other than an automobile (e.g., motorcycles, trucks, etc.), vessels (e.g., ships, motorboats, etc.), home electrical appliances, audio products, construction materials, steel sheet or plate products, and the like.

In conclusion, according to the present invention, the adhesion strength AS1 between the surface of the object and the decorative coat, the adhesion strength AS2 between the protective film and the decorative coat, and the tensile strength TS of the decorative coat represent the relationship as given by Equation (1):

$$AS1>AS2>TS \tag{1}$$

Since Equation (1) is satisfied, the paint substitute film product can be trimmed of an excess end portion thereof automatically while the protective film is peeled off; i.e., the protective film and the excess end portion of the paint substitute film product are removed from the decorative film adhered to the surface of the object simultaneously in one and the same operation. Accordingly, the step of trimming as a separate process step is not necessitated. Therefore, the above paint substitute film product can deliver increased economy in surfacing the object. Moreover, the paint substitute film (decorative coat) can be applied to any objects provided off the shelf; in other words, the material of the target object to which a desired decorative effect is to be given is not limited to the materials fit for subjecting to injection molding. Further, the step of forming the object to be surfaced and the step of applying the paint substitute film can be provided independently.

What is claimed is:

1. A paint substitute film product for surfacing an object, comprising:
   a decorative coat including a light-curable resinous layer; and a protective film provided over a surface of the light-curable resinous layer of the decorative coat, wherein the following equation is satisfied:

$$AS1 > AS2 > TS$$

where AS1 denotes an adhesion strength between a surface of the object and the decorative coat, AS2 denotes an adhesion strength between the protective film and the decorative coat, and TS denotes a tensile strength of the decorative coat.

2. A paint substitute film product according to claim 1 wherein the light-curable resinous layer, when cured, exhibits an elongation percentage ranging between 5% and 10% inclusive.

3. A paint substitute film product according to claim 1 wherein the protective film is formed of a material selected from the group consisting of non-oriented polyethylene terephthalete film, non-oriented polypropylene film, and a laminate of the non-oriented polyethylene terephthalete film and the non-oriented polypropylene film.

4. A paint substitute film product according to claim 1 wherein the protective film is formed with a thickness ranging between 50 μm and 300 μm inclusive.

5. A paint substitute film product according to claim 1, wherein the light-curable resinous layer includes a mixture of an acrylic polymer, a urethane oligomer, an elastomer component and a photopolymerization initiator.

6. A paint substitute film product according to claim 1, wherein the decorative coat is formed with a thickness of 100 μm or thinner.

* * * * *